Nov. 28, 1933.  C. BORNMANN ET AL  1,937,053
FOLDING CAMERA
Filed March 1, 1932  2 Sheets-Sheet 1

INVENTORS.
CARL BORNMANN.
BRUNO C. ROEHRL.
BY
ATTORNEY.

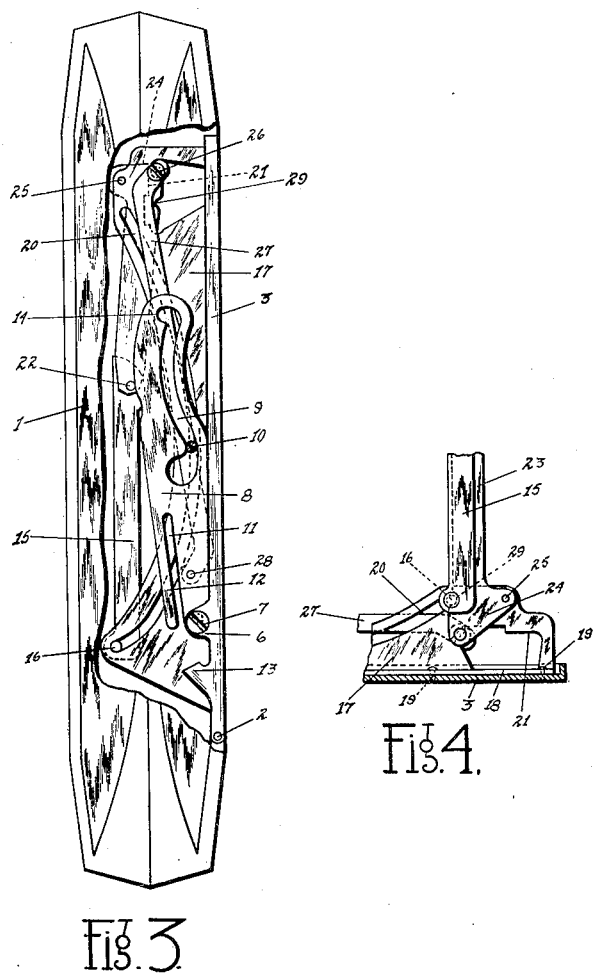

Patented Nov. 28, 1933

1,937,053

UNITED STATES PATENT OFFICE 1,937,053

FOLDING CAMERA

Carl Bornmann and Bruno C. Roehrl, Binghamton, N. Y., assignors to Agfa Ansco Corporation, Binghamton, N. Y., a corporation of New York Application March 1, 1932. Serial No. 596,037

12 Claims. (Cl. 95—40)

Our invention relates to folding cameras and particularly to cameras of that type provided with self-erecting lens holders.

Heretofore in folding camera construction involving mechanism for automatically erecting the camera front or lens holder, the said lens holder has been dependent for its support and guides during the folding and unfolding movement of the camera platform upon the bellows to which it is attached. As a result the lens holder has often given trouble by reason of its non-rigid support during its folding movement, by way of pivoting the wrong way or scraping upon the platform of the camera or causing the bellows to sag and become distorted, etc. Furthermore such a construction which relies upon the bellows for the lens holder support during folding movement, does not readily permit of a strong rigid positioning of the holder in its unfolded or picture taking position.

The primary object of our invention lies in the provision of a folding mechanism connected with the lens holder which at all times positively and mechanically supports, controls, and guides the lens holder throughout the entire movement thereof both to folded and unfolded positions.

Another object of our invention lies in the provision of a folding means which provides a rigid support for the lens holder in unfolded position.

Still another object of our invention lies in the provision of a positive connecting means between the lens holder and the camera platform, such connection serving to guide and move the lens holder and support the same in all positions independently of the bellows.

Other objects and advantages in details of construction will be apparent as the description proceeds, reference now being had to the figures of the accompanying drawings forming a part of this application and wherein like reference numerals indicate like parts.

In the drawings:

Figure 3 is a detail side view of a camera completely folded, and with parts of the casing broken away to show the position of the folding mechanism therein.

Figure 4 is a detail view partly in section illustrating the front end of the folding mechanism on the camera platform.

Figure 1:
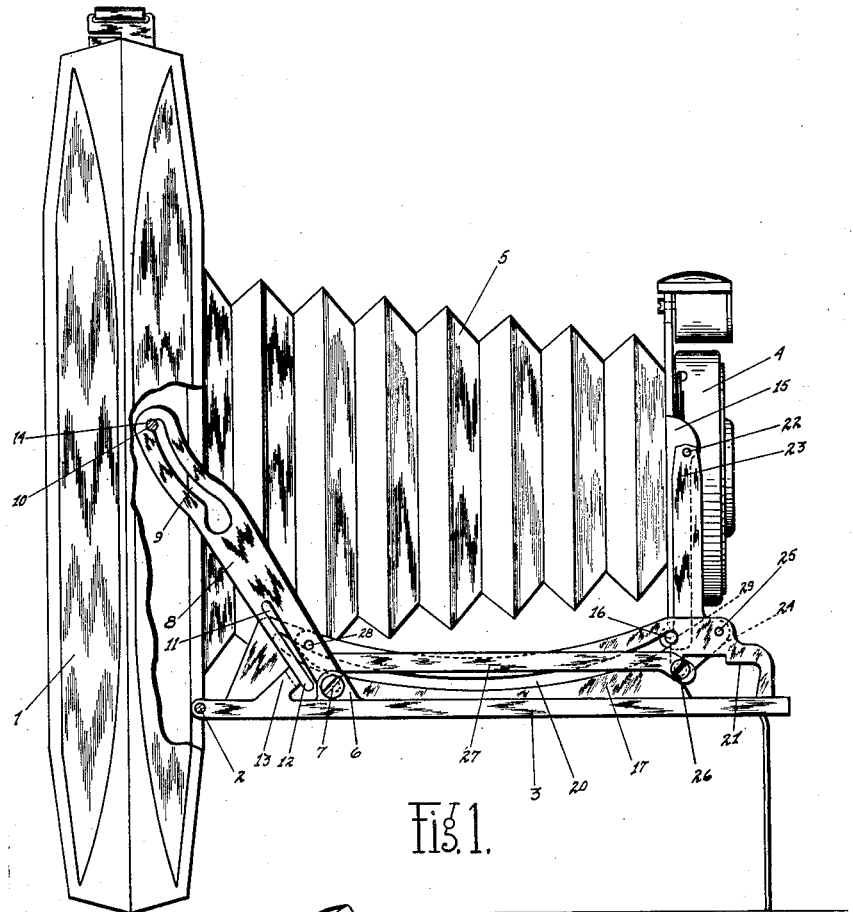
Figure 1 is a side view of a folding camera equipped with our invention, certain parts being broken away for clearness of illustration.

The reference character 1 refers generally to the camera body which, of course, may be of any desired size, shape, or design. Pivoted to the camera body as at 2 is a platform 3 which when folded as in Figure 3, closes the front of the camera, and which when unfolded as in Figure 1 supports the lens carrier 4 in its forward, vertical position for making exposures in the usual way.

The usual folding bellows 5 connect the lens carrier 4 and the camera body.

The platform 3 is provided on each side at a point spaced slightly forwardly of the pivot 2 with upstanding ears or lugs 6 to which are pivoted as at 7 one end of the arms 8, the opposite ends of which are provided with closed slots 9 within which engage pins 10 fixed in the camera body substantially above the pivot 2. The pivot members 7 are eccentrically mounted with respect to the lugs 6 for a purpose to be described.

The arms 8 are provided adjacent the ends which engage the platform with open slots 11 which form spring fingers 12. The platform is provided on each side with upstanding fixed lugs 13 with which the spring fingers 12 are adapted to engage when the platform is lowered to the position shown in Figure 1. The upper end of the closed slots 9 in the arms 8 are notched slightly as at 14 and the pins 10 on the sides of the camera body are adapted to engage in the notches 14 when the platform is lowered to its horizontal position and in which position the spring fingers 12 are placed under tension by virtue of their engagement with the lugs 13. The tension of the spring fingers 12 and the engagement of the pins 10 in the notches 14 provide a resilient catch or locking means for the platform in its lowered position. When it is desired to fold the platform to closed position, the arms 8 are pressed inwardly toward the camera body adjacent their upper ends, and against the tension of the spring fingers 12, so as to disengage the notches 14 from the pins 10, whereupon the platform can be raised, the pins 10 engaging in the curved slots 9 and permitting the arms 8 to thus be guided in their upward movement with the platform 3 to the position shown in Figure 3 when the platform is closed.

The construction so far described is conventional and in common use and forms no part of this invention except in combination with the new features hereinafter described and for the eccentricity of the pivots 7.

The lens carrier 4 is provided with a rigid supporting frame 15, the lower end of which extends slightly below the carrier 4 and is provided on each side thereof with a fixed pin 16.

The platform 3 is provided adjacent each side edge with upstanding longitudinally disposed guide members 17. These members may be cast integral with the platform 3 but are preferably, and as shown, provided at their lower edges with flanges 18 secured to the platform 3 as by the rivets 19. (See Figure 4.) These guide members 17 extend for substantially the entire length of the platform 3 and are each provided with an elongated arcuate slot 20 engageable within which is the adjacent pin 16 carried at the lower end of the lens carrying frame 15. The front end of each of the guide members 17 is cut out as at 21 for a purpose to be described.

Pivoted as at 22 to the frame 15 on each side of the lens carrier 4, is a lever 23. Each of the levers 23 is provided at its lower end with an offset portion 24 pivoted as at 25 to the front ends of the guide members 17 at points above the cutout portion 21 thereof. Thus these levers 23 are pivoted at one end to the lens carrier frame 15 and adjacent their opposite ends to the guide members 17, fixing a definite spaced relation between the carrier frame and the guide members.

The extreme lower ends of the levers 23 extend downwardly into alignment with the cutout portions 21 thereof and pivoted to such lower extending ends, through the cutout portions 21, as at 26, are the front ends of arms 27 pivoted at their rear ends as at 28 to the arms 8 adjacent the lower ends of such arms 8. These arms 27 parallel the guide members 17 and establish a definite spaced relation between the lower ends of the levers 23 and the arms 8.

The lower end of each of the levers 23 is provided with a notch 29 which when the parts are in the unfolded position shown in Figure 1, register with the extreme front ends of the arcuate slots 20 in the guide members 17 and in position to receive the pins 16 on the carrier frame 15.

Figure 2:
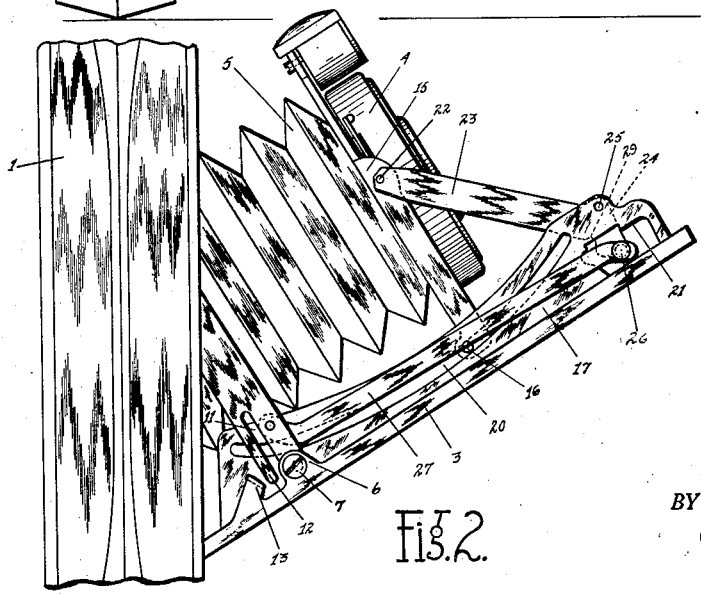
Figure 2 is a detail side view showing the camera platform and attendant parts partially folded.

It will be understood, of course, that there are duplicate parts on each side of the platform 3. Figures 1, 2 and 3 show the parts on one side of the camera and Figure 4 shows certain of the duplicate parts on the opposite side thereof, this figure being taken on a line to show the inner surface of such parts as distinguished from the other views.

The operation of our invention is as follows: Assuming the parts to be in unfolded position shown in Figure 1, and it being desired to close the camera and fold the bellows and lens carrier back into the body of the camera, and close the platform to the position shown in Figure 3, the operator merely presses inwardly on the upper ends of the arms 8 to release the catch formed by the pins 10 and notches 14 whereupon the platform 3 may be raised upwardly about its pivot 2. As the platform raises upwardly the arms 27 by virtue of their pivotal connection at one end with the arms 8, and their pivotal connection with the lower ends of the levers 23, rock such levers 23 on their pivots 25 causing the upper ends of such levers 23 to exert a rearward pressure upon the carrier frame 15 causing the same to move rearwardly towards the camera.

During such movement the curvature of the slots 20 in the guide members 17 in which the pins 16 slide, and the definite spaced relation provided between the carrier frame and the front end of the guide member serves to maintain the lens carrier and frame in substantially vertical position with respect to the platform until the pins have reached the rear ends of the slots 20, which being curved upwardly, permit the carrier to assume a position parallel with the platform as shown in Figure 3. All during the sliding movement of the lens carrier rearwardly into the body of the camera, it is positively moved and guided and supported, independent of the bellows 5, thus insuring its smooth and easy sliding movement and preventing its binding and striking the platform. It will be noted with reference to Figure 3 that when the lens carrier has been moved completely into the camera body and the platform closed, the lever 23 will have swung about its pivot 22 to a position diametrically opposite to that which it maintains when in unfolded position. It will be noted also, that in such position, the lower end of the lever 23 with its pivot 26 for the arm 27 will have assumed a position in the front end of the cutout portion 21 in the guide member 17.

Now when it is desired to open the camera and lower the platform 3 to the position shown in Figure 1, the outward and downward movement of the platform results in the lever 23 exerting a pull at its pivot ends 22 on its carrier which causes the same to move outwardly along the guide member 17, the pins 16 moving freely in the slots 20 in such guide members. The same positive guide and supporting forces serve during this outer movement to maintain the carrier in definite position with respect to the platform independent of the bellows, as in the case of the folding movement.

When the platform assumes its final outward position, as shown in Figure 1, the notches 29 in the levers 23 engage against the pins 16 in the extreme front ends of the slots 20, and due to the pivotal connection between the arm 27 and the lever 23 and arm 8, the latter being under tension because of the spring fingers 12, the lens carrier is positively held under tension in its proper vertical position with respect to the platform. This tension is adjustable to the desired amount by turning the eccentric pivot 7 in the lug 6, thus varying the tension of the spring fingers 12. In this position also it will be noted that the extreme lower end of the lever 23 carrying the pivot 26 (which pivot extends through the cutout portion 21), is in such position that the pivot member 26 engages the rear edge of such cutout portion, thus providing a positive stop for the lever 23 in predetermined carrier supporting position.

It will thus be seen that we have provided an automatic folding mechanism for the lens carrier of a camera which includes a positive connection between the carrier and the platform, and a positive guiding means between these elements whereby the carrier is not dependent upon the bellows and its support and guiding during the folding and unfolding movements of the platform.

Of course, changes may be made in details of construction and arrangement of parts without departing from the spirit and scope of our invention. We do not limit ourselves, therefore, to the exact form herein shown and described other than by the appended claims.

We claim:

1. A folding camera comprising a body and a hinged platform, a lens carrier, braces between said body and said platform, supporting levers connecting the forward end of said platform and said carrier, and guiding means connecting said carrier and said platform, whereby said carrier is maintained out of contact with said platform thruout its movements.

2. A folding camera comprising a body and a hinged platform, a lens carrier, braces between said body and said platform, supporting levers connecting the forward end of said platform and said carrier, guiding means connecting said carrier and said platform, and a positive connection between said supporting levers and said braces, whereby said carrier is maintained out of contact with said platform thruout its movements.

3. A folding camera comprising a body and a hinged platform, a lens carrier, braces between said body and said platform, supporting levers connecting the forward end of said platform and said carrier, and a positive connection between said supporting levers and said braces, whereby said carrier is maintained out of contact with said platform thruout its movements.

4. A folding camera comprising a body and a hinged platform, a lens carrier, braces between said body and said platform, guide members fixed on said platform and provided with slots, pins on said carrier engaging in said slots, and supporting levers pivoted at one end to said members and at their opposite ends to said carrier, whereby said carrier is maintained out of contact with said platform thruout its movements.

5. A folding camera comprising a body and a hinged platform, a lens carrier, braces between said body and said platform, guide members fixed on said platform and provided with slots, pins on said carrier engaging in said slots, supporting levers pivoted at one end to said members and at their opposite ends to said carrier, and arms connecting said braces and said levers, whereby said carrier is maintained out of contact with said platform thruout its movements.

6. A folding camera comprising a body and a hinged platform, a lens carrier, braces between said body and said platform, guide members fixed on said platform and provided with arcuate slots, pins on said carrier engaging in said slots, supporting levers pivoted at one end to said members and at their opposite ends to said carrier, said members having cutout portions, and arms pivoted at one end to said braces and at their opposite ends to said levers through said cutout portions.

7. A folding camera comprising a body and a hinged platform, a lens carrier, braces between said body and said platform, guide members fixed on said platform and provided with arcuate slots, pins on said carrier engaging in said slots, supporting levers pivoted at one end to said members and at their opposite ends to said carrier, said members having cutout portions, and arms pivoted at one end to said braces and at their opposite ends to said levers through said cutout portions, one end of said cutout portions comprising a limiting stop for said levers in one position thereof.

8. A folding camera comprising a body and a hinged platform, a lens carrier, braces between said body and said platform, guide members fixed on said platform and provided with arcuate slots, pins on said carrier engaging in said slots, supporting levers pivoted at one end to said members and at their opposite ends to said carrier, said members having cutout portions, and arms pivoted at one end to said braces and at their opposite ends to said levers through said cutout portions, one end of said cutout portions comprising a limiting stop for said levers in one position thereof, the pivotal points of said levers with said members being intermediate the pivotal points of said levers and said carrier and arms.

9. A folding camera comprising a body and a hinged platform, a lens carrier, braces between said body and said platform, guide members fixed on said platform and provided with arcuate slots, pins on said carrier engaging in said slots, supporting levers pivoted at one end to said members and at their opposite ends to said carrier, said members having cutout portions, and arms pivoted at one end to said braces and at their opposite ends to said levers through said cutout portions, one end of said cutout portions comprising a limiting stop for said levers in one position thereof, the pivotal points of said levers with said members being intermediate the pivotal points of said levers and said carrier and arms, and said levers being provided with notches engageable with said pins in one position of said carrier.

10. A folding camera comprising a body and a hinged platform, a lens carrier, braces pivoted to said body and to said platform, arms pivoted at one end to said braces, supporting levers pivoted at one end to said carrier and at their opposite ends to said arms, and guide members on said platform, said levers being pivoted intermediate their ends to said members.

11. A folding camera comprising a body and a hinged platform, a lens carrier, braces pivoted to said body and to said platform, arms pivoted at one end to said braces, supporting levers pivoted at one end to said carrier and at their opposite ends to said arms, guide members on said platform, said levers being pivoted intermediate their ends to said members, said guide members having slots therein, and pins on said carrier engageable in said slots, one end of said slots and said levers comprising a limiting stop for said carrier in one predetermined positon thereof.

12. A folding camera comprising a body and a hinged platform, a lens carrier, braces pivoted to said body and to said platform, arms pivoted at one end to said braces, supporting levers pivoted at one end to said carrier and at their opposite ends to said arms, and guide members on said platform, said levers being pivoted intermediate their ends to said members, the pivots for said braces on said platform being eccentrically mounted for adjustment.

CARL BORNMANN.
BRUNO C. ROEHRL.